United States Patent [19]

Scott et al.

[11] 3,798,557

[45] Mar. 19, 1974

[54] INTERPOLATION OF SINUSOIDAL SIGNALS

[75] Inventors: Larkin B. Scott, Fort Worth, Tex.; George Roth, Stamford, Conn.

[73] Assignee: The Perkin-Elmer Corporation, Norwalk, Conn.

[22] Filed: Mar. 31, 1972

[21] Appl. No.: 239,932

[52] U.S. Cl. .................. 328/133, 328/166, 328/110

[51] Int. Cl. .................. H03b 3/04

[58] Field of Search .......... 328/109, 110, 133, 155, 328/166

[56] References Cited

UNITED STATES PATENTS

| | | | |
|---|---|---|---|
| 3,469,196 | 9/1969 | Cowin et al. | 328/133 |
| 3,517,322 | 6/1970 | Lay | 328/155 X |
| 3,539,930 | 11/1970 | Strole | 328/133 X |
| 3,588,710 | 6/1971 | Masters | 328/133 |
| 3,710,265 | 1/1973 | Gray | 328/110 X |

*Primary Examiner*—John S. Heyman

*Attorney, Agent, or Firm*—S. A. Giarratana; F. L. Masselle; D. R. Levinson

[57] ABSTRACT

An interpolating system particularly adapted to obtain finer resolution in the readout of a pair of sinusoidal signals in quadrature, utilizing zero-crossing detecting techniques. The system retains the information as to which of the two signals leads the other. In the specific embodiment twelve evenly spaced, resolved elements (in the form of logic signals) are produced for each original full cycle of the signals, while retaining the advantage of the zero-crossing detection technique, e.g., insensitivity to (simultaneous) amplitude changes in both quadrature signals. The system preferably operates on a pair of pure A. C. sinusoidal waves (i.e., free of any D.C. component) each having equal (even if simultaneously varying) amplitude, but can be used on any pair of signals from which such equal amplitude pure sine waves in quadrature can be extracted. One field of use is in processing signals from distance-measuring interferometers, so as to obtain a more finely resolved distance measurement of the object being monitored (e.g., in units of 1/24 of the wavelength of radiation, where a whole cycle of the sinusoidal signals corresponds to ½ of a wavelength).

7 Claims, 8 Drawing Figures

INTERPOLATION OF SINUSOIDAL SIGNALS

This invention relates to an interpolating system for increasing the resolution of measurement of A.C. signals. In particular the signal interpolating system of the invention operating on a pair of sinusoidal signals in fixed phase relationship produces, by zero-crossing detection techniques, more than two (e.g., 12) evenly spaced logic or digital-type signals for each cycle of one of the signals, as well as an indication of which of the two original signals leads the other. This zero-crossing measurement technique allows precise interpolation to more finely resolved evenly spaced intervals as long as the original signals are (or can be made into) a pair of equal amplitude pure sine waves in phase quadrature even though the amplitudes of the A.C. signals (simultaneously) vary. Additionally, such an A.C. signal interpolator according to the invention does not require any sampling, averaging, storing or precise delay of the original signals being measured, thereby avoiding both complexity and the possibility of variations in the final measurement caused by changes in the components of such systems.

Although the A.C. signal interpolating system of the invention may be utilized with any pair of signals that are or can be made into a pair of (equal amplitude) sine waves in quadrature, for purposes of concreteness it will be assumed than the inventive system is being utilized to provide a finer readout than is otherwise obtainable by direct zero-crossing detecting techniques of the output of an interferometer. In various types of interferometers the final signals provided to the readout are in the form of two sine waves in quadrature, the cyclical amplitude of which varies with the distance of the object being monitored (as measured by a reflector carried thereby, typically a corner cube), which of the two signals leads the other being determined by whether the distance to the object is increasing or decreasing. For example, signals of this general type are obtained in U. S. Letters Patent No. 3,610,491 to William Reid Smith-Vaniz as the output of detectors 36 and 38 at ($e_{36}$ and $e_{38}$, respectively) in FIGS. 1 and 4 thereof, for example. Although any such signals containing sine waves in fixed phase relationship may be utilized in the invention (as will be seen hereinafter), the inventive system and technique preferably operates directly on a pair of pure A.C. (i.e., free of any D.C. component) sinusoidal signals in quadrature. An interferometer that inherently produces an output comprising such a pair of pure sine waves (i.e., having a zero D.C. componet) is disclosed in U. S. patent application Ser. No. 198,581 filed on Nov. 15, 1971 by John J. Russo (and assigned to the assignee of the instant application), as indicated at X and Y in FIGS. *3d* and *3f* therein, respectively. For purposes of simplicity, it will be initially assumed that the signals to be operated on to obtain finer resolution by the interpolating technique of the invention are two pure sine waves in quadrature; but as will be seen hereinafter any pair of signals including as the significant measured quantity a pair of sine waves which are in fixed phase relationship may be processed so as to be converted into two pure sine waves in phase quadrature and then interpolated by the invention.

An object of the invention is therefore the provision of an interpolating system for producing finer resolution of a pair of sinusoidal signals in fixed phase relationship, as well as providing an indication of which of the two sine waves leads the other.

A related object of the invention is the provision of such an interpolating system which utilizes a zero-crossing detection technique, thereby exhibiting both insensitivity to (simultaneous) amplitude variation of the two sine waves as well as freedom from drift.

A related object of the invention is the provision of such an interpolating system which avoids any sampling and averaging techniques and any precise delay and storage of the original signals, thereby both reducing the relative complexity and sources of error inherent in other types of systems for increasing the effective resolution of measurement of the signals.

Other objects, features and advantages of the invention will be obvious to one skilled in the art upon reading the following detailed description of a single embodiment of the invention in conjunction with the accompanying drawings in which.

Figure 1:
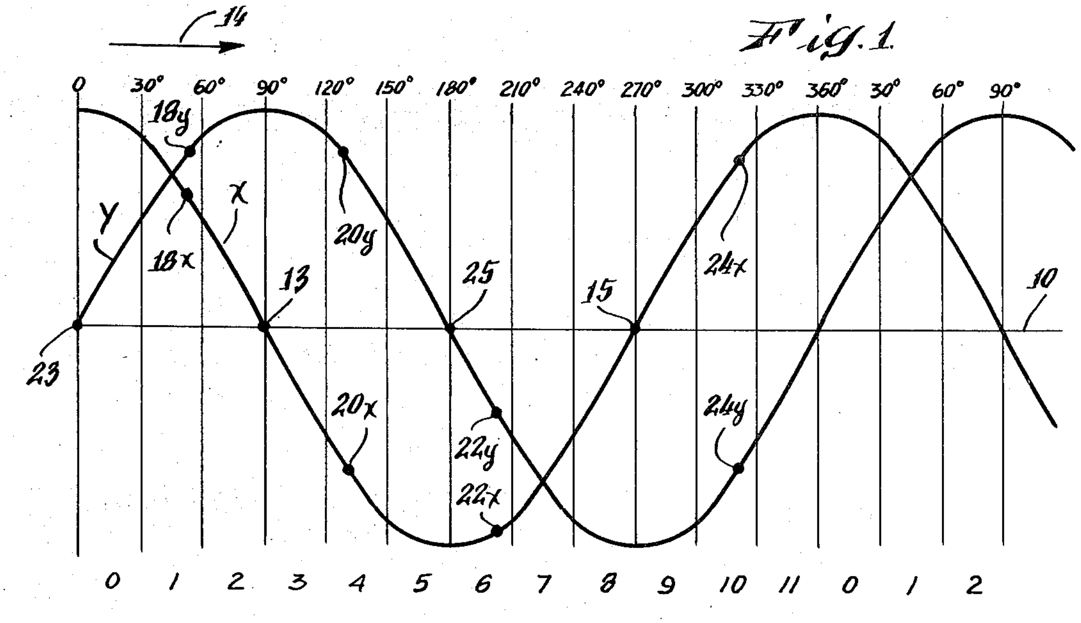
FIG. 1 is a graphical representation of a pair of quadrature-related pure sinusoidal waves of equal amplitude on which the interpolating system of the invention operates, which of the signals (X or Y) leads the other indicating a particular condition (e.g., direction) of the quantity represented by these signals.
Figures 2, 5, 6A:
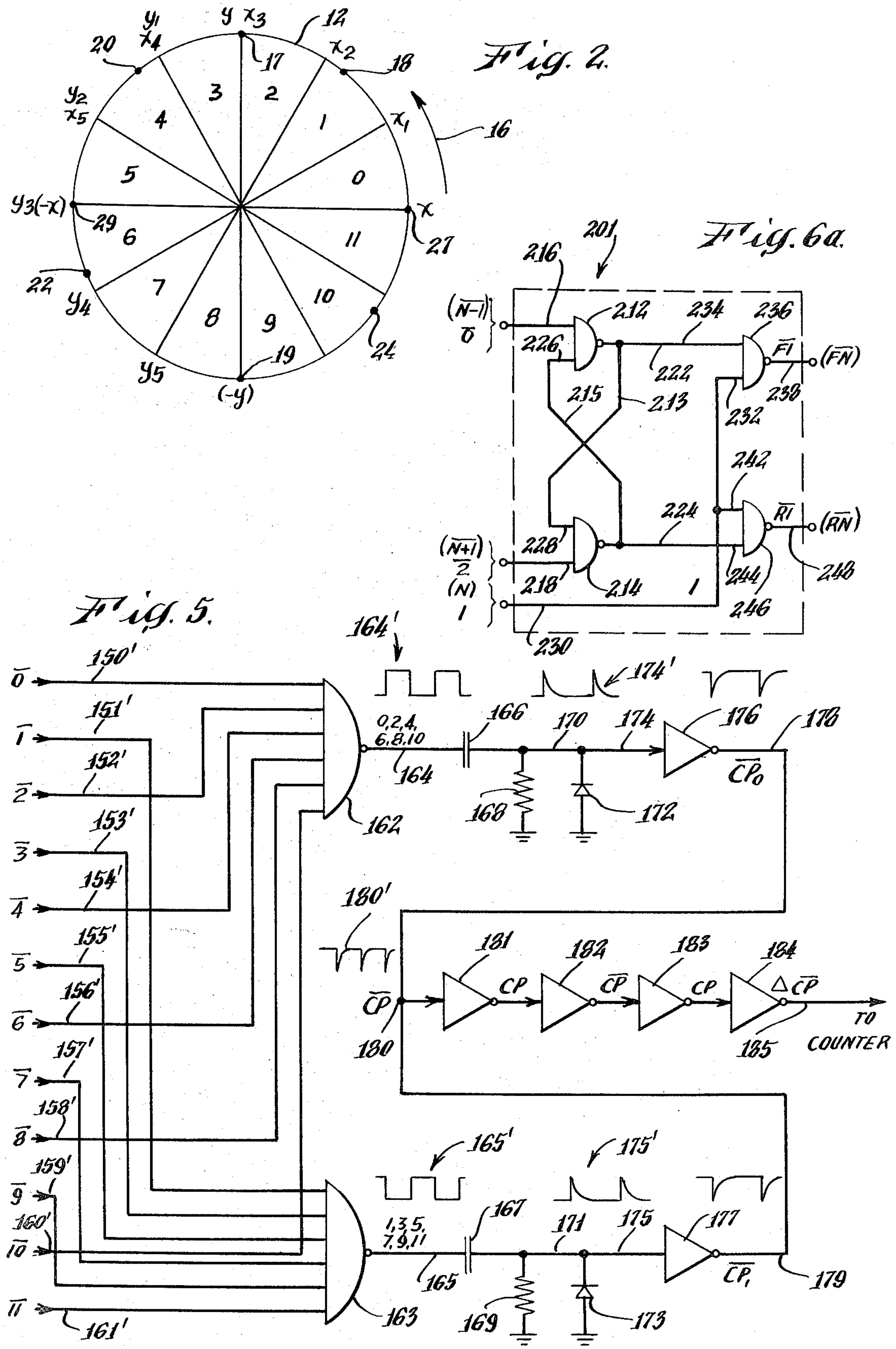
FIG. 2 is a representation of a circular oscilloscope pattern which would be generated if the two signals of FIG. 1 were applied to its vertical and horizontal inputs, this figure also graphically illustrating the manner in which the signals can be interpolated so as to provide 12 equally-spaced resolved elements per cycle of the original signals.
Figure 4:
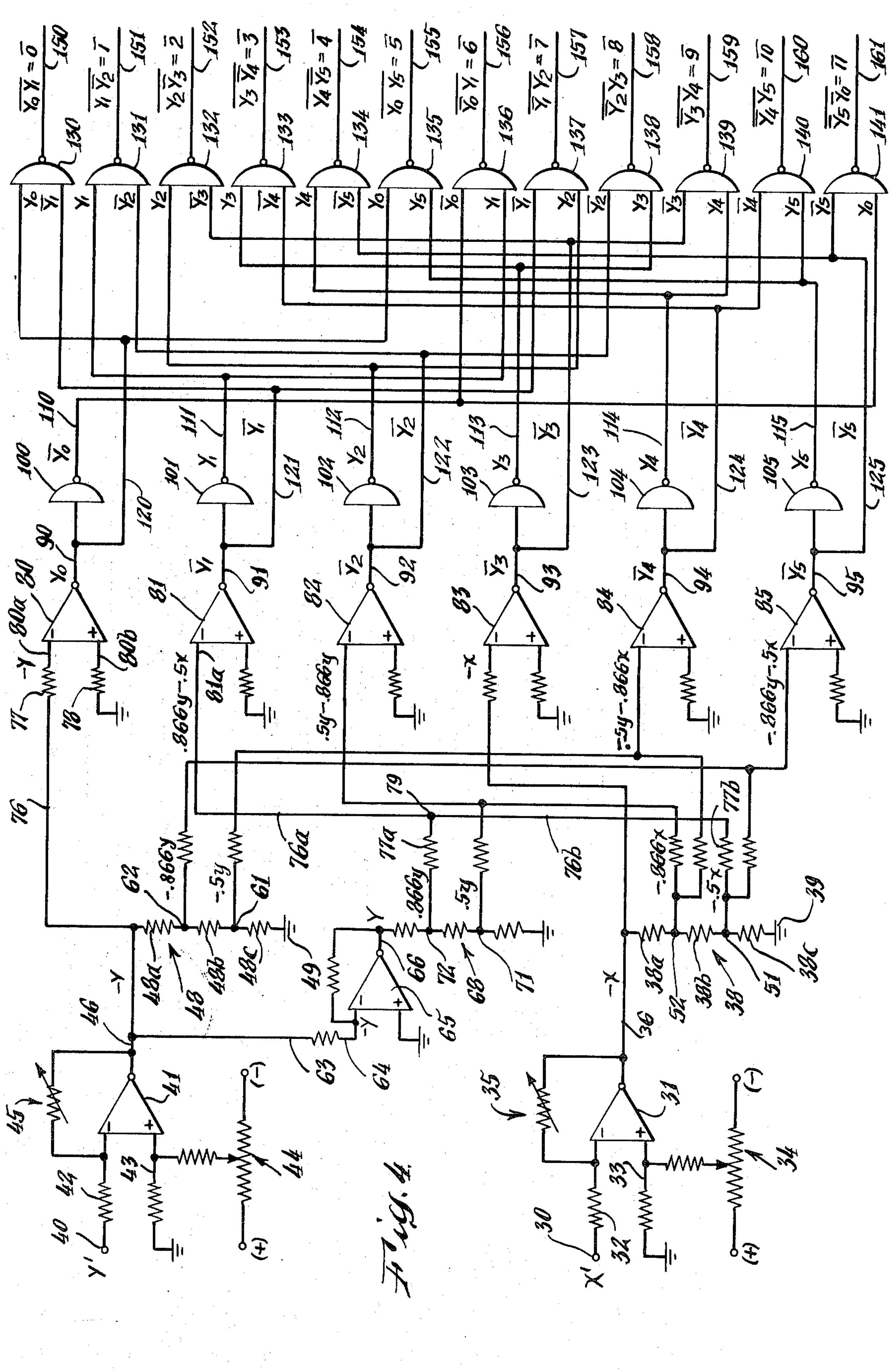

FIG. *3a* illustrates the levels of the six basic logic signals generated in accordance with the polarity (sign) of the value of the original signals relative to the six axes of FIG. 2;

FIG. *3b* is a graphical representation of the 12 logic level signals obtainable by combining (AND type logic) various pairs of the six logic signals of FIG. *3a* and six inverted signals obtained therefrom, which logic signals indicate the presence of the FIG. 2 circular signal in each of the 12 sectors therein and therefore indicate in which of 12 equal portions or intervals of a cycle the signals of FIG. 1 are at any given time;

FIG. 4 is an electrical schematic of an exemplary circuit for generating the signals of FIGS. *3a* and *3b;*

Figure 6:
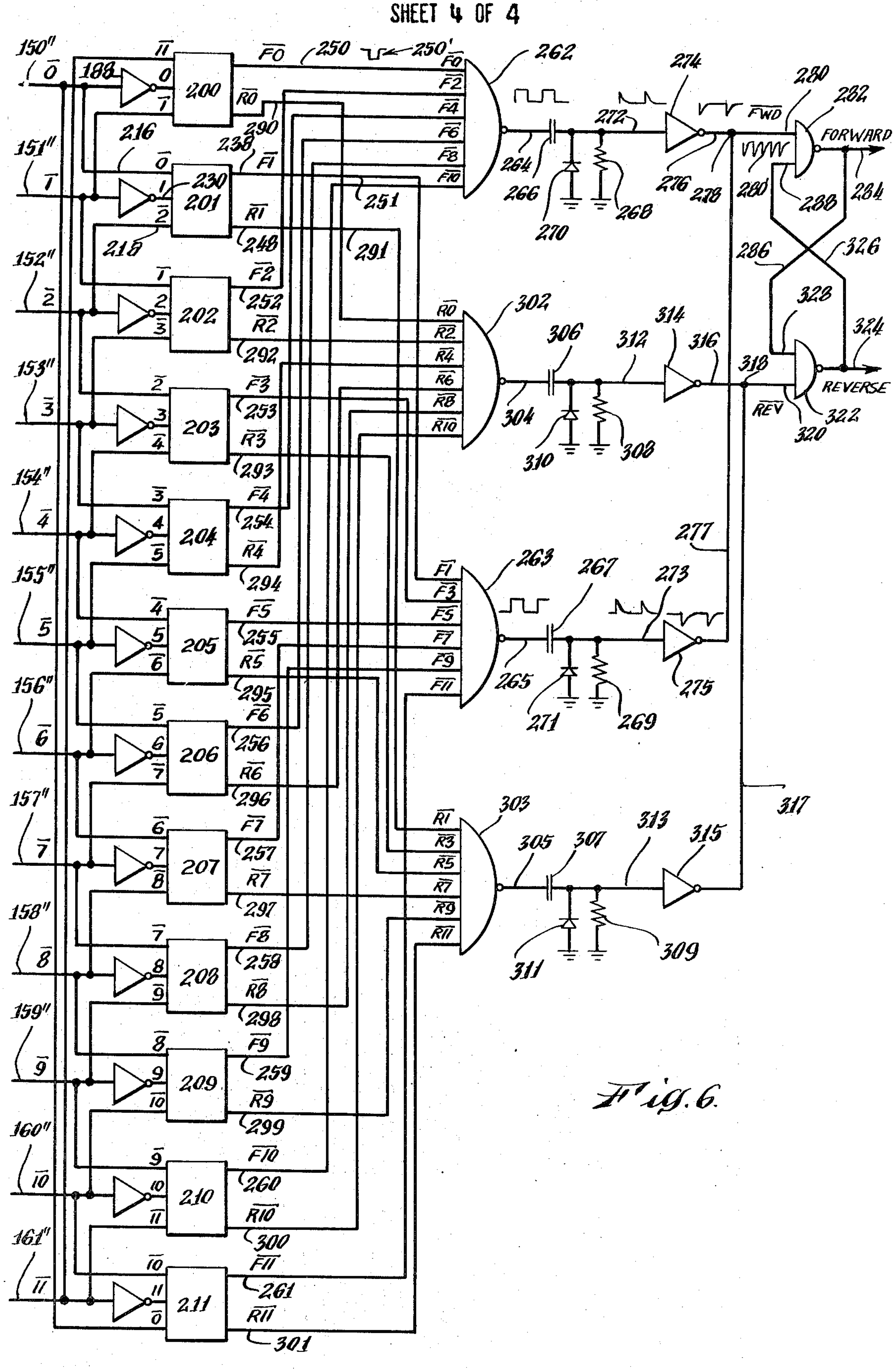

FIG. 5 is an electrical schematic of an exemplary circuit for generating a pulse (from the FIG. *3b* logic signals) every time the circular signal crosses from one of the 12 sectors into another in FIG. 2, and therefore when the signals of FIG. 1 enter a different one of the 12 equal portions of a cycle;

FIG. 6 is an electrical schematic of an exemplary circuit for providing a logic signal to indicate the direction of each sector crossing the circular signal in FIG. 2, and therefore which of the two signals (X and Y) in FIG. 1 leads the other by 90°, so as to identify the direction that each pulse of FIG. 5 should be counted and FIG. *6a* is a detailed electrical schematic of a flip-flop circuit utilized in the circuit of FIG. 6.

In FIG. 1 are shown at X and Y two sinusoidal wave forms in quadrature (the X signal leading the Y signal in the particular illustrative example). The X and Y signals are actually completely separate (i.e., on separate leads), but are shown superimposed for purposes of explanation. Temporarily assuming that the X and Y signals are both pure sine waves with no D.C. component (i.e., are symmetrical about the horizontal axis indicated at 10 that is equal to zero volts) and are of equal amplitude and in phase quadrature, we may write the equations for X and Y as follows:

$$X = K \cos \theta \text{ and} \quad (1)$$

$$Y = K \sin \theta . \quad (2)$$

As is well known, if such signals are supplied to the horizontal and vertical deflection plates of an oscilloscope, a perfect circle, such as shown at 12 in FIG. 2, will be generated. Thus as $\theta$ varies (either with time or in accordance with the distance of an object in interferometers of the type referred to above), the amplitude of the X and Y signals may be still read from the circular pattern 12 in FIG. 2 with reference to the $x$ (horizontal) and Y (vertical) axes indicated.

If the $\theta$ values in FIG. 1 are measured from left to right as indicated by arrow 14 so as to assume the numerical values indicated therein, the corresponding $\theta$ values in FIG. 2 would be measured counterclockwise with the zero degree value for $\theta$ being at the right-hand end of the $x$ axis as indicated by the tail of curved arrow 16 in FIG. 2. Thus the arbitrarily chosen pair of simultaneous points $18_X$ and $18_Y$ on the FIG. 1 curves would correspond to point 18 on circular curve 12 in FIG. 2, having not only the same value of $\theta$ but also the same values of X and Y as measured in Cartesian coordinates from the vertical and horizontal axes. therein. This is of course similarly true for a pair of points such as at $20_X$ and $20_Y$ in FIG. 1 (corresponding to point 20 in FIG. 2) where the X value is negative; for points such as $22_X$ and $22_Y$ in FIG. 1 corresponding to point 22 in FIG. 2 where both the X and Y values are negative; and for points such as $24_X$ and $24_Y$ in FIG. 1 corresponding to point 24 in FIG. 2 in which only the Y value is negative. Both patterns, of course, exactly repeat every time $\theta$ reaches 360°.

Utilizing the original X and Y signals of FIG. 1, it is, of course, possible to obtain by zero-crossing techniques a pair of signals (e.g., pulses) for each cycle of either the X or the Y signal, since each crosses the zero axis at 12 two times in each full cycle of 360°. It may be noted that each zero-crossing of the X signal in FIG. 1 (at points 13,15) during each 360° cycle corresponds to the circular signal 12 crossing the vertical or $y$ axis (once at the top at 17 and once at the bottom at 19); while each zero-crossing of the Y signal of FIG. 1 (at 23,25) corresponds to the crossing of circular signal 12 in FIG. 2 of the $x$ axis (once at the right at 27 and once at the left at 29) for each cycle. It is theoretically possible to obtain four such equally spaced zero-crossing signals (e.g., logic level changes or digital (pulse) signals) by detecting each zero-crossing of both the X and Y signals in each cycle. Zero-crossing measurement techniques are preferred since they are insensitive to overall amplitude changes in the pure A.C. wave forms being measured (i.e., variations in the factor K in the above equations does not adversely affect the measured crossing points of the signals with the zero volt horizontal line 10 in FIG. 1) The manner in which the X and Y signals may be resolved into a greater number of equally spaced, resolved portions or elements, while retaining the advantages of zero-crossing detecting techniques may best be seen from FIG. 2.

If one were to draw on the face of an oscilloscope a series of radial lines through the center of the circular pattern 12 so as to divide the circle into (preferably an even number) of equal size sectors, equally spaced resolved portions of the original signals may be formed by determining when the rotating spot following the circle 12 crossed from one sector into another. For exemplary purposes, it will be assumed that the circle is divided into 12 sectors (numbered 0, 1, 2 . . . 11) by providing in addition to the original (horizontal) x axis and (vertical) $y$ axis additional axes each rotated 30° relative to the previous one. Thus in addition to the original x axis, there will be a $x_1$ axis rotated 30° counterclockwise relative to the original axis; an $x_2$ axis rotated 60° relative to the original $x$ axis (and, of course, additional 30° relative to the $x_1$ axis); an $x_3$ axis at 90° relative to the original $x$ axis; an $x_4$ axis at 120° counterclockwise from the original $x$ axis; and an $x_5$ axis at 150° from the original $x$ axis. Similarly, the $y_1$ axis (forming the other Cartesian coordinate with the $x_1$ axis) will be 30° counterclockwise relative to the original $y$ axis; the $y_2$ axis will be at 60°; the $y_3$ axis at 90°; the $y_4$ axis at 120° and the $y_5$ axis at 150°, all relative to the original $y$ axis and in a counterclockwise direction. In this particular choice of the number of axes, it happens that the various axes coincide (i.e., the $y$, $y_1$ and $y_2$ with the $x_3$, $x_4$ and $x_5$, respectively, and the $y_3$, $y_4$ and $y_5$ with the $-x$, $-x_1$ and $-x_2$, respectively). It is emphasized that the exemplary number of total $x$ and $y$ axes (namely six each including the original axes) dividing the circle into (12) sectors (of 30° each) is for purposes of concreteness and purely exemplary, any number of axes which divide the circle into a (preferably even) number of substantially equal size sectors being theoretically equally useful.

As can be readily shown from analytical geometry, the X and Y coordinates values relative to the $x_1$ and $y_1$ axes (mutually rotated counterclockwise 30° from the original axes) are given by the following:

$$Y'_1 = Y \cos 30° - X \sin 30° \quad (3)$$

$$X'_1 = X \cos 30° + Y \sin 30° \quad (4)$$

Just as the value of Y will be positive whenever the moving spot generating the circle 12 in FIG. 2 is "above" the original $x$ axis (i.e., more counterclockwise than the right-hand or positive end of the axis but less counterclockwise than the left-hand or negative end of the axis) so as to be in any one of the sectors numbers 0 – 5, the vaue of $Y'_1$ will be positive whenever the circular signal is more counterclockwise than the right-hand end of the $x_1$ axis but less counterclockwise than the left-hand (negative) end of the $x_1$ axis (which coincides in the exemplary 12 sector embodiment with the $y_4$ axis). Thus the $Y'_1$ derived signal will be positive in the sectors numbered 1– 6, and negative in the sectors numbers 7 – 11 and 0. Although the $X'_1$ derived signal defined by the equation above will similarly be positive whenever the circular signal is more counterclockwise than the upper or positive end of the $y_1$ axis but less that counterclockwise from the lower or negative end thereof so that it also could be used to determine the position of the "spot" on the circle 12, the information obtained from a complete set of signals of the $Y'_1$ and $X'_1$ type would be (in the particular illustrative example) redundant, since crossing of the rotating spot of the $y_1$ axis necessarily occurs at the same time as the spot crosses the $x_4$ axis. Therefore, for the particular twelve sector exemplary embodiment (or in general the number of sectors is evenly divisible by four) there is no advantage in generating derived signals of both the $x_1$ and $y_1$ type, a complete set of either type of signals being sufficient to determine when the rotating spot crosses each of the six axes dividing the circle into twelve sectors. In the exemplary embodiment it is the Y, $Y'_1$, etc. type signal that is utilized, although it is obvious that the analogous X, $X'_1$, etc. signals could be utilized instead. A complete set of derived signals giving the Y coordinates relative to the various x axes is given below.

| Axis | Name | Value | |
|---|---|---|---|
| $x$ | $Y'_0$ | $= Y$ | (5.0) |
| $x_1$ | $Y'_1$ | $= Y\cos 30° - X\sin 30° = .866Y - .5X$ | (5.1) |
| $x_2$ | $Y'_2$ | $= Y\cos 60° - X\sin 60° = .5Y - .866X$ | (5.2) |
| $x_3$ | $Y'_3$ | $= Y\cos 90° - X\sin 90° = -X$ | (5.3) |
| $x_4$ | $Y'_4$ | $= Y\cos 120° - X\sin 120° = -.5Y - .866X$ | (5.4) |
| $x_5$ | $Y'_5$ | $= Y\cos 150° - X\sin 150° = -.866Y - .5X$ | (5.5) |

Figure 3A:
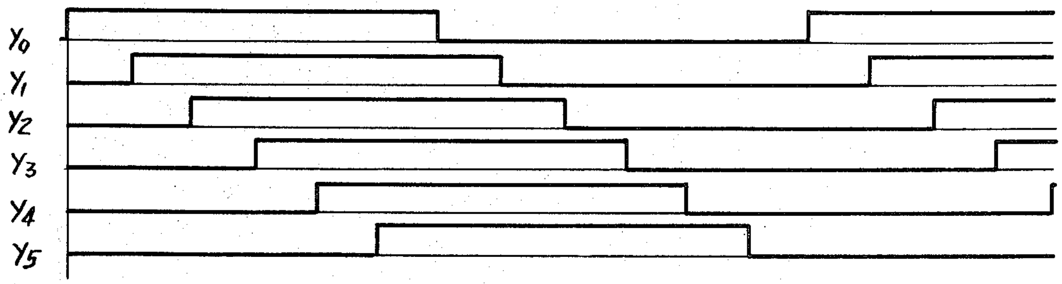

These signals would form a series of sine waves, each having a 30° lag relative to th previous one if plotted in FIG. 1 (i.e., $Y'_1$ would lag Y by 30°; $Y'_2$ would lag Y by 60°, etc.). FIG. 3*a* shows the manner in which the polarity (sign) of each of these derived signals varies during the parts of a cycle relative to the original X and Y signals. In particular each of the $Y'_0$, $Y'_1$, etc. derived signals are treated as logic level (or digital) signals $Y_0$, $Y_1$, etc. that have one value (hereinafter referred to as "high" or the "1" state) whenever their value is positive (i.e., greater than zero) and another state (hereinafter referred to as the "low" or "0" state) whenever their value is negative. In particular each of these logic signals is "high" (or in the "1" state) whenever the rotating spot of FIG. 2 is more counterclockwise than the positive end of the corresponding x axis but less counterclockwise than the negative end of the same axis. As may be seen from FIG. 3*a*, each of the $Y_0$, $Y_1$, etc. logic signals will, therefore, be "high" for six consecutive sectors (i.e., half a circle) but each will be displaced by one sector (equivalent to a section of one-twelfth of a cycle in FIG. 1) relative to the adjacent logic signal. The corresponding 12 sections, hereinafter usually called resolved "portions" or "elements" of the full cycle, are numbered in the same manner as in FIG. 2 to show the correspondence. Comparing the logic signals $Y_0$, $Y_1$, $Y_2$, etc. in FIG. 3*a*, it will be readily seen that the first or zero sector is uniquely determined by the fact that the $Y'_0$ signal is greater than zero, (i.e., $Y_0$ is in its "high" or "1" state) while the $Y'_1$ signal is less than zero ($Y_1$ in its "low" or "0" state). This, of course, directly follows from FIG. 2 wherein the rotating spot on the circle 12 is in the zero sector only when its Y coordinate relative to the $x$ axis is positive while the $Y'_1$ coordinate (measured relative to the $x_1$ axis) is negative. Similarly, the necessary and sufficient condition for the rotating spot to be in section 1 in FIG. 2 is the $Y'_1$ is greater than zero ($Y_1$ "high") while $Y'_2$ is less than zero ($Y_2$ "low"), and so on.

Figure 3B:
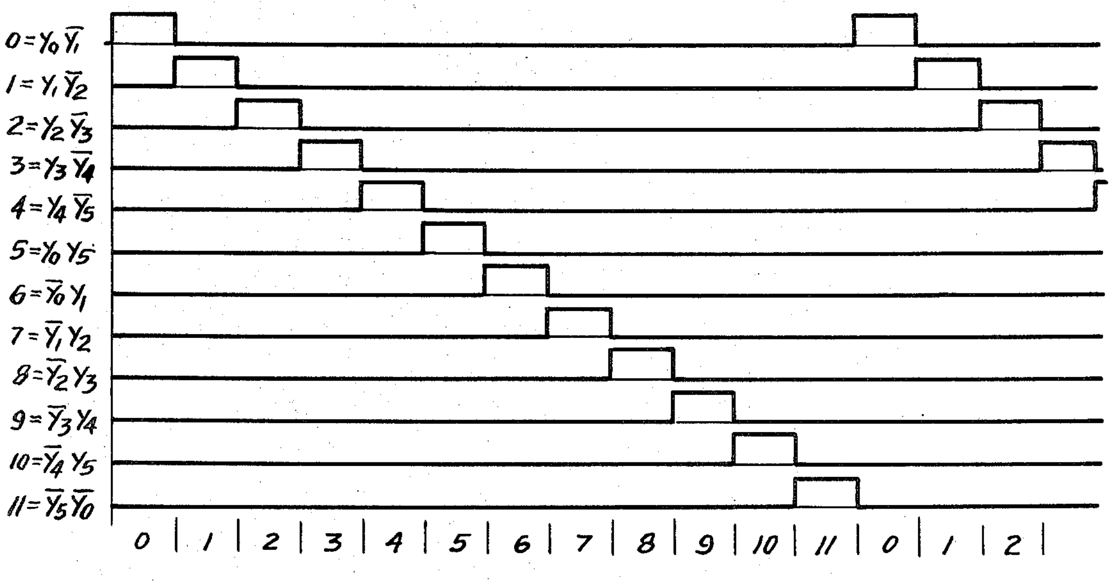

In FIG. 3*b* the various logic signals (0 – 11) indicating the presence of the rotating spot of FIG. 2 in each of the sectors are indicated both as to their logical derivation and their value, illustrated graphically. Thus the 0 signal is defined as the $Y_0$ logic signal being "high" or in its "1" state (i.e., the Y signal being positive) simultaneously with the $Y_1$ signal being in its "low" or "0" state (or in conventional logic symbolism the inverted $Y_1$ signal, namely $\overline{Y}_1$ being "high"; thus $0 = Y_0$ AND $\overline{Y}_1$ or $0 = Y_0\overline{Y}_1$). This 0 logic signal will, therefore, occur (i.e., be in its "high" or "1" state if, and only if, the $Y_0$ signal is high simultaneously with the $Y_1$ signal being low. Similarly, signals representing the presence of the rotating spot in sectors 1, 2, 3 and 4 are directly derivable from the indicated AND type combination of successive pairs of the similarly numbered Y signal and the inverted next highest numbered Y signal (e.g., $Y_1\overline{Y}_2$; $Y_2\overline{Y}_3$; etc.). The logic signal 5, indicating that the rotating spot of FIG. 2 is in the correspondingly numbered sector or that the original signals of FIG. 1 are in their sixth (of 12) equally spaced portions of a cycle, occurs when both the $Y_0$ and the $Y_5$ signals are simultaneously high as may be seen from FIG. 3*a*. In other words, referring to FIG. 2, the rotating spot will be in sector 5 when its Y coordinate (namely $Y'_5$) is positive relative to (that is, counterclockwise relative to the labeled positive end of) the $x_5$ axis and is also positive relative to the original $x$ axis (i.e., has not yet reached in a counterclockwise direction the negative or left-hand end of this $x$ axis, labeled $-x$).

The logical signal 6 will exist, indicating the rotating spot is in sector 6 of FIG. 2, when the spot has already passed in the counterclockwise direction the negative end of the original $x$ axis but has not yet reached the negative end of the $x_1$ axis; stated in other terms, the $Y_0$ logic signal will have already passed to its low state (since $Y'_0$ or Y is negative) while the $Y_1$ signal will still be positive. Thus the logical signal 6 will exist when the $Y_0$ signal is low (or in other words the inverted $Y_0$ signal or $\overline{Y}_0$ is high) and the $Y_1$ is high. Analogously, the signals 7, 8, 9 and 10 indicating that the rotating spot is in the correspondingly numbered sectors in FIG. 2 will be generated whenever the spot has already passed the negative end of that $x$ axis which is numbered six lower but has not yet reached the negative end of the $x$ axis numbered only five lower. Thus logical signals 7 – 10 are generated by the combination indicated at the left side of FIG. 3*b* and will occur as indicated the in the graphical representation of the rest of FIG. 3*b*, the correctness of their occurrence being readily seen by comparison with the values of the logic signals $Y_1 - Y_5$ in FIG. 3*a*. Finally the last sector locating logic signal 11 will occur when the rotating spot has already passed the negative end (which in this case is the generally right-hand end) of the $x_5$ axis but has not yet reached the positive right-hand end of the original $x$ axis, so that the Y coordinates relative to both the $x_5$ and $x$ axes (i.e., the values of $Y'_5$ and $Y'_0$) are both negative. Thus the rotating spot will be in section 11 only when the logic levels of both $Y_5$ and the $Y_0$ signals are both low (or in other words, when each of these signals, when logically inverted, are both high) and, therefore, exists or is "high" itself only when $\overline{Y}_5$, $\overline{Y}_0$ is high.

Thus the 12 signals (0, 1, 2, etc.) indicated in FIG. 3b uniquely determining each of the sectors of FIG. 2 or the consecutive twelfth of a cycle of FIG. 1, may be readily generated from the original six logic signals ($Y_0$, $Y_1$, $Y_2$, etc.) of FIG. 3*a*, and their logically inverted counterparts. It should be noted that each of the $Y_0$, $Y_1$, $Y_2$, etc. logic signals are in their high or low state in direct correspondence to whether the corresponding function ($Y'_0$, $Y'_1$, $Y'_2$, etc.) given in the table previously is greater or less than 0, so that these logic signals are derived from the original data by zero-crossing detection techniques, thereby preserving the advantages of these techniques (and in particular their insensitivity to the equal fluctuation in amplitude of the original X and Y signals of FIG. 1). Since the sector or portion resolving signals of FIG. 3*b* are of the logic or digital type directly derived from the similar type signals of FIG. 3*a*, obviously no analog type errors can occur in this derivation. Although the twelve signals shown in FIG. 3*b* provide the basic quantitative information desired, namely, to resolve the original signals of FIG. 1 into 12 equal resolved portions, intervals or elements, the signals in FIG. 3*b* do not in themselves indicate which of the original signals X, Y led the other (although the ordered sequence in which the signals of FIG. 3b are generated do). A specific exemplary manner in which this information may be generated in convenient (logic level) form will be described hereinafter in relation to the circuitry for accomplishing this purpose. It should be noted that if the Y signal led rather than lagged the X signal by 90° in FIG. 1, than the spot following the circle 12 in FIG. 2 would merely reverse its direction of rotation (i.e., from counterclockwise to clockwise) so that each of the signals in (FIG. 3*a* and therefore) FIG. 3*b* would be generated in the opposite time relationship relative to each other. Thus the order of sequence of the (FIG. 3*a* and) FIG. 3*b* signals do indicate which of the X,Y signals in FIG. 1 leads the other.

Before explaining the manner in which signals corresponding to FIGS. 3*a* and 3*b* may be generated and utilized as well as the manner the information as to which of the original X and Y signals led the other is preserved (and presented in convenient forms), it will be shown that although pure sine waves having no D.C. component and being of equal amplitude are preferably utilized as the input, the invention may be used to resolve into finer elements a pair of sine waves in quadrature which are both unequal in A.C. amplitude and/or either or both of which contain a (different) D.C. component. Thus in the more general case the original signals may be in the form:

$$X' = a_1 + b_1 \cos \theta \text{ , and} \quad (6)$$

$$Y' = a_2 + b_2 \sin \theta \text{ .} \quad (7)$$

If two such signals are supplied to the horizontal and vertical deflection plates of an oscilloscope (assuming that both pairs of *a*'s and *b*'s are not 0 and unequal to each other), one will obtain in general an ellipse which is not centered on the origin of the oscilloscope. However, by providing between the original X' and Y' signals and the deflection plates of the scope means for adding a variable D.C. signal (including both positive and negative values) and a variable gain amplifier, one can cause the resulting "picture" on the scope to be made into a circle having a center in the origin of the oscilloscope. In particular, adding a positive D.C. signal to the horizontal deflection plate channel would move the entire figure to the right (obviously adding a negative D.C. voltage signal causing moving to the left), adding a positive D.C. signal to the vertical deflection plate along with the Y' signal will move it up (or adding a negative D.C. signal will move it down); and by varying the relative gain of the amplifiers (preferably after the elipse has been centered) will cause the elipse to gradually form a perfect circle. Mathematically the operation of adding D.C. signals to center the figure both horizontally and vertically on the scope is simply adding a signal to the X' signal above equal to $-a_1$, and to the Y' signal a D.C. signal equal to $-a_2$ to thereby obtain:

$$X'' = b_1 \cos \theta \text{ , and} \quad (8)$$

$$Y'' = b_2 \sin \theta \text{ .} \quad (9)$$

Varying the gain of either amplifier (in fact only one is really required) to form a perfect circle is merely the operation of determining the relative gain values necessary to make $g_1 \times b_1 = g_2 \times b_2 = K$. For purposes of comprehensiveness, it will therefore be assumed that the original signals are not necessarily perfectly equal in A.C. amplitude nor perfectly free of any D.C. component. Therefore, the exemplary apparatus about to be described has provision for adjusting the original signals in this manner, although it is again pointed out that such adjustment is unnecessary if the signals are already in the preferred form illustrated in FIG. 1.

Approached another way, the more general case of equations (6) and (7) may be solved for the cosine and sine, thus:

$$\cos \theta = (X' - a_1)/b_1 \quad (10)$$

$$\sin \theta = (Y' - a_2/b_2) \quad (11)$$

Dividing equation (11) by equation (10), so as to form the tangent of $\theta$, gives:

$$\tan \theta = \frac{\sin \theta}{\cos \theta} = \frac{\frac{Y' - a_2}{b_2}}{\frac{X' - a_1}{b_1}} \quad (12)$$

Since tan $\theta$ or $\sin\theta/\cos\theta$ is necessarily equal to the ratio of the pure, equal amplitude waves Y and X shown in FIG. 1, we may note that Y/X is also equal to the various terms of equation (12), so that the right-hand term may be equated thereto, thus:

$$\frac{\frac{Y' - a_2}{b_2}}{\frac{X' - a_1}{b_1}} = \frac{Y}{X} \quad (13)$$

Therefore, it is only necessary to treat the expressions in X' and Y' on the left of equation (13) to reduce them to the form of the X and Y in the manner explained above prior to the other operations, about to be described.

It is even possible to treat the most general case, when the original sinusoidal signals are not in quadrature (although in fixed phase relationship) as given by the even more general relationship:

$$X^* = a_1 + b_1 \cos \theta \text{ , and} \quad (14)$$

$$Y^* = a_2 + b_2 \sin ( \theta + \phi ) \quad (15)$$

where $\phi$ is the (fixed) angle by which the waveforms deviate from quadrature. The cosine $\theta$ is as in equation (10):

$$\cos \theta = (X^* - a_1)/b_1 \quad (16)$$

The sine $\theta$ function may be obtained by noting:

$$\sin ( \theta + \phi ) = \sin \theta \cos\phi + \cos\theta \sin\phi \quad (17)$$

so that:

$$\sin ( \theta + \phi ) = \sin\theta \cos\phi + \cos\theta \sin\phi = (Y^* - a_2)/b_2 \quad (18)$$

Substituting for cos $\theta$ the value given in equation (16) and re-arranging terms:

$$\sin \theta \cos \phi = (Y^* - a_2)/(b_2) - (X^* - a_1)/(b_1 \sin\phi \quad (19)$$

Finally dividing by cos $\phi$ , $$\sin \theta = (Y^* - a_2)/(b_2 \cos\phi) - (X^* - a_1)/(b_1) (\sin\phi)/(\cos\phi) \quad (20)$$

or: $\sin\theta = (Y^* a_1)/(b_2 \cos\phi) - (X^* - a_1)/(b_1) \tan\phi$ (21)

Dividing equation (21) by equation (16) we obtain:

$$\frac{Y}{X} = \tan \theta = \frac{\sin \theta}{\cos \theta} = \frac{\dfrac{Y^* - a_2}{b_2 \cos \phi} - \dfrac{X^* - a_1}{b_1} \tan \phi}{\dfrac{X^* \; a_1}{b_1}} \quad (22)$$

Although more complex to treat, the right-hand term in equation (22) may be reduced to the desirable form by successive subtractions and multiplications of each of the original Y* and X* signals. Thus, a negative D.C. signal of $-a_2$ and $-a_1$ would first be applied to the separate Y* and X* signal channels to form $Y^* - a_2$ and $X^* - a_1$, respectively. These signals would be amplified (separately) to form $(Y^* - a_2)/(b_2 \cos\phi)$ and $(X^* - a_1)/b_1$, respectively ($\cos\phi$ being a constant). The latter signal would then be in the desired form to be treated as X in the processing of FIGS. 4 – 6. The Y signal desired can be formed by subtracting from $(Y^* - a_2)/(b_2 \cos\phi)$ the product of $(X^* - a_1)/b_1$ and $\tan\phi$ (this latter again being a constant), to form a signal in the form of the numerator of the right-hand term of equation (22).

Thus, any A.C. signal containing a pair of equal-period, fixed phase-relationship components can be treated to obtain the desired X and Y signals of the form shown in FIG. 1 which can then be processed in the manner schematically shown in FIGS. 2, 3*a* and 3*b* by the circuits shown in FIGS. 4, 5 and 6. For purposes of simplicity it will be assumed that the original signals are in phase quadrature, but not necessarily either free of any D.C. component or of equal amplitude, although their relative A.C. amplitude will be assumed to be constant and their D.C. levels constant. In other words, the signals will be assumed to be in the form of equations (6) and (7), (12) or (13) above with $a_1$,$a_2$ and at least the ratio of $b_2 b_1$ constant.

In FIG. 4 the original signals X' and Y' which either are or contain (at their sole A.C. components) a pair of sinusoidal components in quadrature which either are (ideally) or can be made to have the same amplitude are introduced at the respective inputs 30,40 of identical operational amplifiers (shown in simplified schematic form). In the particular embodiment this input is assumed to be the inverting side of the two operational amplifiers 31,41 respectively through input resistors 32,42. The other or non-inverting input 33,43 of the operational amplifiers is provided with an adjustable D.C. signal so as to balance out any D. C. component in the original X' and Y' signals, in the manner just explained. Such an adjustable D.C. signal may be obtained from an adjustable potentiometer (capable of delivering negative or positive values as indicated) as shown at 34 and 44 respectively. If the original signals X' and Y' are not necessarily of equal amplitude, a variable gain may be provided for either or both amplifiers as schematically illustrated by a variable resistor 35,45 in feedback relation. Assuming that the D.C. eliminating input signal at 33,43 and the gain at 35,45 are properly set (utilizing an oscilloscope supplied by the output of the amplifiers if necessary), the output of the two operational amplifiers 31,41 will be equal amplitude pure sine waves of the same type (but in this case of opposite sign) as those shown in FIG. 1.

The signal on output leads 36,46 will, therefore, be −X and −Y, respectively, as indicated (the constants of proportionality are omitted for simplicity, since they are identical for both channels). Each of these signals are fed to one end of identical voltage dividers 38,48 which comprise a series string of resistors, the lower end of which is grounded at 39,49, respectively. The resistance value of each of resistors **38*c* and 48*c* is equal to the combined value of resistors 38*a* plus 38*b* and 48*a* plus 48*b*, respectively, so that one-half of the original signal appears at points 51 and 61, respectively, as indicated. The sum of the resistances of 38*b* plus 38*c* (and of 48*b* plus 48*c*) is approximately 0.866 of to total resistance of all three resistors, so that this proportion of the original signals is available at junction points 52,62, respectively, as indicated. The −Y signal at the output 46 of differential amplifier 41 is also fed by lead 63 to the inverting input 64 of an operational amplifier 65, so that the Y signal appears on its output lead 66 as indicated. Amplifier 65 operates in a closed loop (negative feedback) mode to act as a (unity gain) linear amplifier (similar to the low gain linear amplifiers 31 and 41). This signal is supplied to the upper end of a voltage divider 68 identical to dividers 38 and 48, so as to obtain at junction points 71,72** the 0.5Y and 0.866Y signals indicated.

As may be seen from the previously given table, or for the values of the functions in FIG. 3*a*, all of the necessary terms to generate the functions of FIG. 3*a* are available through proper combination of the various signals on leads 36,46 and at junction points 51, 52, 61, 62, 71 and 72. Thus, in order to generate the $Y_0$ signal, it is only necessary to supply the Y signal available at output 46 by means of lead 76 through a coupling resistor 77 to the inverting input 80*a* of an operational amplifier 80, acting as a comparator comparing the value of its input at 80*a* to a zero level at its positive or non-inverting input 80*b* by means of grounded resistor 78. Amplifier 80 (and amplifiers 81–85) operate as open loop, very high again amplifiers, so as to act as zero crossover switches (i.e., level detector). Thus, the output at 90 of the zero-crossing comparator 80 will be the desired $Y_0$ digital type signal.

The next differential amplifier acting as a zero-crossing comparator at 81 is fed at its upper or inverting input 81a both the 0.866Y signal from junction point 72 (through a resistor 77*a* identical to resistor 77) and the −.5X signal available at junction point 51 through another identical resistor 77*b* and leads 76*a* and 76*b*, respectively, (the actual adding occurring at junction point 79). Thus, the input to the comparator or differential amplifier 81 will be in the form of the $Y'_1$ signal, but in view of the inverting nature of the amplifier relative to this input, its output at 91 will be the $Y_1$ inverted (i.e., $\overline{Y}_1$) as indicated. Just as inverter 100 receiving at its input the $Y_0$ signal will supply at its output 110 the inverted $Y_0$ signal ($\overline{Y}_0$), so the indentical inverter $Y_1$ receiving at its input the inverted $Y_1$ signal, ($\overline{Y}_1$) will supply at its output at 111 the non-inverted $Y_1$ signal. In analogous manner each of the inverting inputs of the differential amplifiers 82, 83, 84 and 85 (all acting as zero-crossing comparators or detectors) will receive the appropriate signals (or, in the case of amplifier 83, signal) to generate at their respective outputs 92–95, but all in inverted form, the desired signals $\overline{Y}_2-\overline{Y}_5$, all of which are again inverted by respective digital inverters 102–105 so as to supply at 112–115 the non-inverted signals $Y_2-Y_5$. Thus, lead 110 has the inverted $Y_0$ ($\overline{Y}_0$) logic signal while lead 120 has the un-inverted $Y_0$ logic signal. On the other hand, each of leads 111–115, respectively, contains the un-inverted corresponding logic signals ($Y_1-Y_5$) and each of leads 121–125 has the inverted logic signals ($\overline{Y}_1-\overline{Y}_5$). The first five NAND gates 130–134 receive at their two inputs the un-inverted correspondingly numbered Y signal and the next highest number Y signal in inverted form, so as to generate the inverted combined signals indicated at their outputs, which are, of course, the same as the signals, but in inverted form, indicated at the left in FIG. 3b, so as to be the inverted signals 0, 1, 2, 3 and 4 (that is, $\overline{0}$, $\overline{1}$, $\overline{2}$, $\overline{3}$ and $\overline{4}$). Similarly NAND gate 135 receives the appropriate signals to generate the 5 logic signal, but because of its inverting nature, also supplies this signal in inverted form ($\overline{5}$). Analogously, the other six NAND gates 136 – 141 receive the appropriate signals at their two outputs to produce in inverted form the desired signals, namely $\overline{6}$, $\overline{7}$, $\overline{8}$, $\overline{9}$, $\overline{10}$ and $\overline{11}$. It should be noted that since amplifiers 80 – 85 are high gain zero-crossing comparators all of the signals to the right of the amplifiers in FIG. 4 are of a logical digital type, that is, are either high or low, it again being mentioned that conventional details of all the amplifiers (including those at 31, 41 and 65) have been omitted.

Thus, the desired signals, but in inverted form, shown in FIG. 3*b*, are available on leads 150 – 161, respectively. In order to generate a pulse every time the rotating spot of FIG. 2 enters a different sector (or in other words, every time the signal Y shown in FIG. 1 enters the next of each of the 12 resolved portions or elements indicated therein), the relatively simple combining circuit of FIG. 5 may be utilized. The continuation of the FIG. 4 output leads, indicated at 150′ - 161′ in FIG. 5 carry, respectively, the inverted signals 0 - 11 ($\overline{0}$ - $\overline{11}$) to one of the six inputs of one of the two NAND gates 162, 163, respectively. Since any one of the signals ($\overline{0}$ – $\overline{11}$), say $\overline{N}$, will always be generated immediately after the next lower number signal, $\overline{N-1}$ (signal $\overline{11}$ being considered one lower than signal $\overline{0}$ in this sense) for the relationship of the original signal shown in FIG. 1, in order to insure that the $\overline{0}$ – $\overline{11}$ signals are always discretely counted, it is only necessary to insure that no two adjacently numbered signals are supplied to the same NAND gate. Thus, the even-numbered ones are supplied to the upper NAND gate 162 while the odd-numbered ones are supplied to the lower NAND gate 163. It may be noted that if the original X and Y signals are in opposite phase quadrature, the numbered signals in FIG. 3*b* will merely be generated in the opposite order so that the two NAND gates 162,163 will still never receive adjacent signals.

Thus, the output at 164 of the upper NAND gate will be "high" whenever any one of the inverted even numbered signals is present. Thus, the output 164 will contain the combined (in the logical OR sense) signals 0, 2, 4, 6, 8, 10. Analogously, the output 165 of the other NAND gate 163 will have the combined signals 1, 3, 5, 7, 9, 11. These square wave signals are differentiated by the RC network composed of capacitance 166 and resistor 168, and capacitor 167 and resistor 169, respectively, so as to yield a pulse signal at 170,171, respectively, for each of the leading and trailing edges of each of the square waves. The negative going pulses (corresponding to the trailing edges) are grounded through diodes 172,173 so as to form on leads 174,175 at 174′, 175′, a single pulse for each occurrence of each of the square waves (at 164′, 165′, respectively). Each of these pulses, hereinafter referred to as the count pulse or CP is fed to the input of the inverting amplifier 176,177 so as to emerge as an inverted counting pulse at the output 178,179, the form of which is indicated above these leads. The inverted count pulse signals at 178, namely $\overline{CP}_0$, necessarily occur at different times than the inverted counting pulses, $\overline{CP}_1$ at 179 since each pulse represents a particular edge (say, the positive-going or leading edge) of a series of different square waves which are necessarily out of phase, as indicated by the square wave forms (164′,165′) indicated on leads 164,165, respectively. Therefore adding these two sets of signals ($\overline{CP}_0$ and $\overline{CP}_L$) as by a simple junction of leads 178,179 at point 180 will yield a composite inverted counting pulse wave form, $\overline{CP}$ which contains the total number of pulses generated, as indicated by the wave form (180′) adjacent this junction point. The total count pulse signal is slightly delayed by being sent through a series of inverters 181 - 184, so as to emerge at the output 185 as a slightly delayed inverted count pulse signal $\alpha$ $\overline{CP}$. The reason for providing the slight delay by the string of inverters is merely to insure that the individual delayed inverted count pulses occur slightly after the direction sensing circuit of FIG. 6 (about to be described) has had an opportunity to determine which of the original quadrature signals X and Y in FIG. 1 leads the other (i.e., whether the spot in FIG. 2 is rotating counterclockwise (as it will for the phase relationship shown in FIG. 1) or clockwise, as it will if the X signal lags rather than leads the Y signal by 90°).

The manner in which the circuit of FIG. 6 operates to determine the two possible phase relationships between the original X and Y signals may be best visualized from noting that in FIG. 2 if the phase relationship of the signals is as in FIG. 1, the rotating spot will necessarily enter each sector after having passed through the next lower numbered sector (again sector 11 being considered "lower numbered" than sector 0 in this sense). If the Y signal led rather than lagged the X signal by 90°, the then clockwise rotating spot would, of course, then enter each sector from the next higher numbered sector. The then existing situation can easily be visualized by simply considering the $\theta$ values in FIG. 1 as reading from right to left (rather than from left to right) which obviously is equivalent to reading the $\theta$ values in FIG. 2 in a clockwise direction and generating the various signals in FIG. 3*a*,3*b* in a sequence from right to left rather than from left to right. Thus, in order to determine whether the phase relation of the original X and Y signals are in the relationship shown in FIG. 1 (hereinafter called the "forward" direction) or in the opposite phase relationship (hereinafter called the "reverse" direction) it is only necessary to determine whether the rotating spot in FIG. 2 enters a particular numbered sector from the adjacent lower numbered or higher numbered sector. Since the signals in FIG. 3*b* directly indicate which of the sectors the rotating spot is in, it is only necessary to determine whether a particular numerical logic signal (e.g., the 1 signal) is immediately preceded by a lower numbered logic signal (e.g., the 0 signal) for forward direction or by a higher numbered signal (e.g., the 2 logic signal) when the direction is "reversed". FIG. 6 depicts one manner in which this information may be obtained.

The 12 inputs 150″ – 161″ at the left of FIG. 6 are merely direct connections to the outputs 150 – 161 of FIG. 4, so as to contain the inverted sector logic signals $\overline{0}$ – $\overline{11}$. Each of these inputs are fed through separate identical inverters 188, which therefore generate at their output the un-inverted signals 0 – 11, respectively, as indicated. These signals are supplied as one input to each of separate but identical flip-flop circuits 200 – 211 which are also supplied (by appropriate leads from 150″ – 161″) with the next lower and next higher inverted sector determining signal. Thus, flip-flop circuit 201 will be supplied at one input with the inverted 0 ($\overline{0}$) signal, at another input with the inverted 2 ($\overline{2}$) signal and at its third input with the un-inverted 1 signal. As to flip-flop circuits 200 and 211, it is again noted that the 11 signal is numbered 1 lower than the 0 signal and conversely the 0 signal is considered to be numbered 1 higher than the 11 signal.

An exemplary construction of each of the identical flip-flop circuits 200 – 211 is given in FIG. 6a, which for purposes of concreteness will be assumed to be the particular flip-flop circuit 201 receiving the specific switching (upper and lower in FIG. 6) inputs of the inverted 0 ($\overline{0}$) signal and the inverted 2 ($\overline{2}$) signal, respectively, and at its third or main input (shown in the middle of the blocks in FIG. 6 but at the bottom of FIG. 6*a*) the un-inverted 1 signal. The first stage of the flip-flop circuit in FIG. 6*a* comprises a pair of NAND gates 212,214 having their respective outputs connected to the input of the other by leads 213,215, respectively, so as to form, along with their other inputs 216,218, a flip-flop. The outputs 222,224, respectively, of the NAND gates 212,214 will be in their "low" state only when both of the inputs to each NAND gate 216 and 226, and 218 and 228, respectively, are simultaneously "high", while in all other possible conditions of their inputs, the outputs 222,224 will be "high". Assuming the signals X and Y are in the FIG. 1 relationship so that the circular signal of FIG. 2 is rotating counterclockwise, the 0 sector locating logical signal will always immediately precede the 1 sector logical signal. Therefore, as the signal enters the 0 sector, the inverted 0 signal ($\overline{0}$) will go low, thereby setting the output 222 of the upper NAND gate 212 to its "high" condition regardless of the previous condition of the flip-flop comprising the two NAND gates 212 and 214. This now "high" output at 222 is fed by lead 213 to one of the inputs 228 of the other NAND gate 214. Since the signal is now in the 0 sector, it obviously cannot be in the 2 sector and, therefore, the inverted 2 signal ($\overline{2}$) must necessarily be "high" (since the un-inverted 2 signal is, of course, "low"). Therefore, both inputs to the lower NAND gate 214 are "high", so the output at 224 thereof is reset to "low". It should be noted that as the signal next enters the 1 sector, the flip-flop does not change state even though the input of the upper NAND gate 212 goes "high" (since as the 0 logic signal now goes low, the inverted 0 signal ($\overline{0}$) goes high). This is so since the output 224 of the lower NAND gate 214 remains "low" and, therefore, the other input 226 of the upper NAND gate 212 is maintained "low". Thus, the output 222 of the upper NAND gate 212 remains high as the signal leaves the 0 sector and moves into the 1 sector. This latter crossing of course causes the 1 sector-locating logic signal supplied at input 230 to go "high", so that both inputs 232,234 to the upper second stage NAND gate 236 are both simultaneously "high". This, therefore, causes the output 238 to go "low". As the signal leaves sector 1 (entering sector 2) the disappearance of the 1 signal (i.e., its going low) at 230,232 causes the output 238 of the upper second stage NAND gate to again go high, thereby generating a from high to low and back to high square wave having the same duration as the square wave 1 signal (although inverted) designated $\overline{F1}$. It should be noted that although the 1 sector locating signal will also be present (i.e., "high") at input 242 of the lower second stage NAND gate 246, the output of this NAND gate at 248 will remain continuously "high", since its other input 244 will during this time be supplied with the "low" output 224 of NAND gate 214. Thus, the upper second stage NAND gate 236 effectively passes (and inverts) the 1 sector square wave logic signal, while the lower second stage NAND gate 246 does not pass it whenever the signal in FIG. 2 enters the 1 sector immediately after having been present in the 0 sector.

If the phase relationship of the original signals in FIG. 1 are reversed, so that the rotating signal of FIG. 2 were traveling clockwise, then the inverted 2 ($\overline{2}$) signal (going "low" as sector 2 is entered) at input 218 to the lower first stage NAND gate 214 would cause its output at 224 to go "high" prior to the signal reaching the 1 sector. This, of course, would set the output 222 of the upper first stage NAND gate 212 to its "low" state (since the $\overline{0}$ signal at input 216 would also be "high") so as to disable the upper second stage NAND gate 236 (its input at 234 now being low). The lower second stage NAND gate 246, however, would have its enabling input 244 in a "high" state, so that upon the subsequent occurrence of the 1 signal at 230,242, the output 248 of this NAND gate would reproduce the 1 signal in inverted form, designated $\overline{R1}$, whenever sector 1 is approached from the clockwise direction in FIG. 2 (i.e., from the higher number or 2 sector). Thus, the circuit of FIG. 6 *a* causes the 1 signal to be present (in inverted form) either at output 238, when the 1 signal has been immediately preceded by an inverted 0 signal (indicating that the signal in FIG. 2 is traveling in the counterclockwise or "forward" direction), or at the output 248, when the 1 signal is preceded by an inverted 2 signal (indicating opposite phase relationship of the signals in FIG. 1 than that shown, so as to cause the signal in FIG. 2 to be travelling in the clockwise or "reverse" direction).

Thus, a $\overline{F1}$ signal is generated at 238 whenever the 1 sector in FIG. 2 (or the 1 portion in FIG. 1) is entered by signals having a phase relationship shown in FIG. 1, while the $\overline{R1}$ signal is generated at output 248 whenever the phase relationship of the original X and Y signals is opposite to that shown in FIG. 1. Since the specific flip-flop circuit 201 shown in FIG. 6a is representative of any of the flip-flop circuits 200 – 211, the generalized inputs to the upper and lower first stage NAND gates (at 216,218, respectively) are $\overline{N-1}$ and $\overline{N+1}$, respectively, for the generalized input at 230 of N. Similarly the generalized upper output (as at 238) will be $\overline{FN}$, which occurs when the N sector is entered from the "forward" or next lower numbered sector direction in FIG. 2, and the lower output (as at 248) will occur in the general form of $\overline{RN}$ when the N sector is entered from the reverse or clockwise direction (i.e., from the next higher numbered sector).

Thus, in FIG. 6, if the original X and Y signals are in the phase relationship shown, corresponding to the "forward" direction, each of the upper outputs of the flip-flop circuits 200 – 211 will produce an inverted square wave signal during that part of the cycle that the corresponding sector-locating logic signals of FIG. 3*b* exist (or in other words, when the rotating signal of FIG. 2 is in that particular sector). It may be noted that the signals at the upper output, labeled $\overline{F0}$, $\overline{F1}$, $\overline{F2}$, etc., are essentially identical to the original signals present at 150″ – 161″ except for the fact that they will exist only when the signals occur in the "forward" direction, that is, in the manner actually shown in FIGS. 1, 2, 3*a* and 3*b*. When the lag-lead relationship of the original X and Y signals in FIG. 1 are opposite, then none of the $\overline{F0}$, $\overline{F1}$, etc. signals will occur, but rather a complete sequence of signals will appear at R0, R1, etc. (incidentally, these signals will be generated in inverse order since the original signals $\overline{0}$, $\overline{1}$, $\overline{2}$, etc. will also be generated in opposite order, although this will not effect the subsequent operation of the device). Thus, the "direction" of the signals or the original lag-lead relationship of the X and Y signals in FIG. 1 will determine whether the upper or lower outputs of the various flip-flop circuits 200 – 211 are providing the signals.

Each of the two sets of signals from the upper outputs and the lower outputs, respectively, of the flip-flop circuits 200 – 211 are separately combined. Since each of the signals that may occur are the same square wave form (as exemplified by the wave form 250′ on lead 250 at the "forward" or upper output of the flip-flop 200) as the signals at $\overline{0}$ – $\overline{11}$ to the left of FIG. 5, the same technique is utilized in combining these square waves without destroying their discreteness. Specifically, besides maintaining all of the forward and reverse signals completely separate, all of the even numbered and all of the odd numbered signals are in the first instance summed by different NAND gates. Thus, the output leads 250,252,254, etc. from the upper or forward output of the even numbered flip-flop circuits (200, 202, etc.) are all fed as inputs to one NAND gate 262, while all of the leads 251, 253, 255, etc. from the upper or forward outputs of the odd numbered flip-flop circuits (201, 203, etc.) are fed to a separate NAND gate 263. Thus, the output 264 of the NAND gate 262 will contain the (reinverted and therefore) uninverted combined signals F0, F2, F4, F6, F8 and F10, while the output 265 of NAND gate 263 will contain the uninverted signals F1, F3, . . . F11. These series of square waves are unidirectionally differentiated by capacitor 266, resistor 268 and diode 270 (or 267, 269 and 271, respectively) so as to form a series of positive going pulses (in this case corresponding to the leading edges of the square waves on lead 264 or 265, respectively). These positive-going pulses at 272 and 273 are inverted (by inverters 274,275) so as to appear on leads 276,277 as a series of negative-going pulses or inverted pulses. The two sets of pulses on leads 276,277 are combined at junction point 278 so as to form on lead 280 a final inverted form signal $\overline{FWD}$ (the form of which is indicated at 280′) containing an inverted pulse for each of the original sector-designating pulses $\overline{0}$ – $\overline{11}$ which were generated in the forward direction (i.e., with the original Y signal lagging the original X signal by 90°, as in FIG. 1). Thus, the signal on lead 280 will be identical to that at point 180 in FIG. 5 when the original X and Y signals are in this "forward" relationship; but the signal on lead 280 will disappear (while the one at 180 will not) when the phase relationship of the X and Y signal are in the opposite or "reverse" relationship. Before explaining how these pulses are utilized to set the final direction-indicating flip-flop in the exemplary embodiment, the manner in which the pulses are combined if the X and Y signals are in the opposite phase relationship will first be described.

All of the "reverse" or lower outputs of the flip-flop circuits 200 – 211 are combined in a manner exactly analogous to the manner in which the upper or "forward" outputs are combined. Thus, each of the lower "reverse" outputs leads 290, 292, 294, etc. from the even numbered flip-flop circuits (200, 202, etc.) are connected as inputs to one NAND gate 302; while each of the leads 291, 293, 295, etc. from the "reverse" outputs of the odd numbered flip-flop circuits (201, 203, etc.) are fed as inputs to another NAND gate 303. The outputs of each of these NAND gates at 304,305 respectively, are unidirectionally differentiated (by elements 306, 308, 310; and by elements 307, 309 and 311, respectively) so as to be converted into positive pulses on leads 312,313, respectively, and therefore as negative going pulses on output leads 316,317 of inverters 314,315, respectively. Finally, the pulses on leads 316 and 317 (if any) are combined at junction point 318, so that lead 320 carries the total combined inverted pulses that are produced when the phase relationship of the original X and Y signals in FIG. 1 are reversed, these total inverted pulses for this reversed relationship being designated $\overline{REV}$. Since each of the elements 290–320 is the exact analogous or corresponding element for the reverse direction to those elements numbered exactly 40 lower (namely 250 – 280), there is no need to explain their operation which is, of course, exactly the same as that previously described for the lower numbered elements.

It is again emphasized that the effect of (and in fact the whole reason for) that part of the apparatus shown in FIGS. 6 and 6*a* is that only pulses generated at each of the twelve section crossings that are caused by a Y signal that lags the X signal (as shown in FIG. 1) or in other words by crossing of the axes separating the various sectors in FIG. 2 when the signal is rotating in the counterclockwise or "forward" direction will ultimately appear on the "forward" final lead 280. On the other hand, every time one of the section lines in FIG. 1 is crossed by an X and Y signal in opposite phase relationship (i.e., read FIG. 1 from right to left) or by the analogous clockwise rotation of the signal at 12 (from a higher numbered to a lower numbered sector) crossing a sector-dividing axis, a pulse will ultimately appear on lead 320. Thus, when the original X and Y signals maintain one of the phase relationships (e.g., when the distance to an object is being monitored by an interferometer is constantly increasing or decreasing) then one of the two leads 280 or 320, as the case may be, will contain a repetitive series of pulses. However, every time the lag-lead relationship of the X and Y signal changes (e.g., if the object being monitored moves toward and away from or even vibrates toward or away from the rest of the interferometer measuring its distance), the pulses generated at the crossing of each axis (FIG. 2) or each vertical section line in FIG. 1 will appear either on lead 280 or 320 depending on the phase relationship of the signals that case each particular crossing. In fact the pulses at 280 and 320 could be utilized directly to feed the "forward" and "reverse" inputs to a bi-directional counter having the capability to count forward whenever a pulse is supplied to one input and backwards whenever a pulse is supplied to another input (thus, obviating any need for the total count pulses generated in FIG. 5, which, of course, occur at point 180 and, therefore, lead 185 regardless of the direction that each axis or section line was crossed). However, the particular exemplary apparatus provides a count at 180 and, therefore, 185 in FIG. 5 for every such crossing, regardless of direction and utilizes the signals at 280 and 320 in FIG. 6 to set a direction-indicating flip-flop to provide the direction information as a continuous forward or continuous reverse signal, as will now be described.

The direction-indicating flip-flop, comprising the remaining are at the upper right of FIG. 6, includes two NAND gates 282,322 having their respective outputs 284, 224 connected by leads 286,326 to one of the two inputs (namely, 328 and 288) of the other flip-flop. The other input to the NAND gates comprising the flip-flop are, of course, leads 280 and 320, respectively. Whenever a negative pulse (i.e., any part of a $\overline{FWD}$ signal) appears at the upper input to the upper NAND gate 282, its output at 284 will necessarily go "high", regardless of the condition of the output at 324 of NAND gate 322 and, therefore, (because of lead 326) of the other input 288 of NAND gate 282. Thus, the presence of any "low" or negative going pulse at 280 will necessarily cause 284 to have a "high" or positive "FORWARD" state. This high signal, fed over lead 286 to the upper input 328 of NAND gate 322 will cause the output thereof at 324 to go "low" since there necessarily can be no "low" (negative) pulses on lead 320 at this time. The flip-flop will remain in this state (i.e., it is bistable) with a high or "FORWARD" signal on lead 284 and a "low" or absence of a "REVERSE" signal on lead 324 until a negative going or "low" pulse appears on lead 320; it may be noted that further pulses on lead 280 do not, of course, effect the bistable flip-flop when it is in the condition just described.

Upon occurrence of a negative going or low pulse obtained by a "reverse" crossing of the signals on lead 320, the output 324 of the lower NAND gate 322 will be driven "high"; this high signal supplied by lead 326 to input 288 of the upper NAND gate 282 will, of course, then drive its output 284 "low", since by necessity there will be no negative going or "low" pulses present at its other input on lead 280 at this time. Thus, the condition of the flip-flop will be changed to the appropriate condition upon the first occurrence of a "forward" pulse at 280 or a "reverse" pulse at 320. Thus, the output 284 will provide a FORWARD direction indication signal whenever an axis in FIG. 2 is crossed in the "forward" or counterclockwise direction, and the REVERSE direction signal will appear at 324 whenever such an axis is crossed in the "reverse" or clockwise direction of FIG. 2. Thus, the signals at 284,324 may be utilized as gating signals to control the direction of count of the counter, while each of the counting pulses at 185 in FIG. 5 will cause the stepping of the counter by one unit (in the direction determined by the signals at 284,324). The reason for introducing the extra inverters 181 – 184 (acting as delay elements) in FIG. 5 may now be seen as a technique to insure that the elements of FIG. 6 (and in particular the flip-flop comprising NAND gates 282 and 322) have had an opportunity to generate the correct direction signal at 284 or 324, respectively, before each of the corresponding delayed counting pulses on lead 185 is actually generated. This avoids any possibility of counting a pulse in the wrong sense, i.e., before the flip-flop 282,322 has had an opportunity to change its condition so as to indicate the correct direction or "sign" to be given to the counting pulse at 185.

It may be noted that since the counting pulse signal at 180′ in FIG. 5 is identical to the pulses that may occur on leads 280 and 320 combined in FIG. 6, one can omit all of the elements in FIG. 5 lower in number than 180 and replace them with the following. A branch lead can be connected to each of leads 280 and 320 and the two branch leads combined (as by being the inputs to a NAND gate), so as to supply the total pulses that appear on both of the original leads 280 and 320 combined. This combined signal will then be identical with the $\overline{CP}$ signals at point 180 in FIG. 5 (except it will be delayed by the difference in delay occassioned by the FIG. 6 components compared to the FIG. 5 components). It may therefore be utilized directly (or with a further delay, e.g., using components like 181–184 in FIG. 5, to insure that the direction indicating the flip-flop 282,322 operates before the delayed pulse occurs)

in the same manner as the delayed counting pulse at 185 in FIG. 5 is used. Thus the entire FIG. 5 may be replaced by the structurally simplier arrangement.

As previously noted, the entire desired information is also obtained at leads 280 and 320 (without the flip-flop comprising NAND gates 282 and 322 or any of FIG. 5) if a bi-directional counter having a forward and reverse input is utilized. The exemplary embodiment, however, additionally provides a FORWARD and REVERSE type of switching signal at 284,324 as well as a total pulse supplying output (at 185 in FIG. 5 or, more simply, by combining the signals at leads 280 and 320 as just explained), since this is in the form of information that is particularly convenient for utilization with certain types of reversible counters.

The particular embodiment of the invention thus is capable of resolving one cycle of the original signal in FIGS. 1 and 2 into twelve equally spaced interval signals occurring at each 30° interval or portion of the whole 360° cycle. Thus, if a complete 360° cycle of a signal in FIG. 1 represents one-half of a wavelength of light (as it will in distance measuring interferometers of the type previously referred to) assuming that a neon-helium laser (having a wavelength of 6328A or approximately 24.9 microinches) is utilized, one complete cycle of 360° would indicate a change in the object position of approximately 12.45 microinches. By utilizing zero-crossing detection techniques directly on one of the X and Y signals, one would obtain a resolution of one-half this or approximately 6.23 microinches (while still retaining the advantages, especially in sensitivity to gross amplitude changes, of such zero-crossing techniques). By utilizing such zero-crossing techniques of detection on both the X and Y signals of FIG. 1, it is possible to obtain a resolution of about 3.12 microinches. However, the device and technique according to the invention provides a resolution element of about 1.04 microinches (that is, the original 12.45 divided by 12).

Obviously, the underlying technique of the invention may be utilized to subdivide one cycle of the original signal into more or less than 12 elements. To reduce the number of intermediary signals (e.g., the ones shown in FIG. 3*a*) to half the total number of resolution elements desired, it is preferable to utilize an even number of resolution elements per cycle, but even this is not obligatory. Thus, in theory, the technique of the invention may be utilized to obtain any number of resolution elements greater than two per cycle (since each of the X and Y signal crosses the zero axis twice per cycle, the number of sectors must be greater than two in order to increase the resolution). The "fineness" of the resolution is limited only, on the one hand, by the assumption that the signals are (or can be made to be) substantially exactly in quadrature and are or can be made to be pure sine waves (i.e., free of any substantial amount of D.C. components) of substantially identical amplitude, since any moderate deviation from these conditions becomes more and more serious as the number of resolution elements is increased. In addition, the number of resolution elements or sectors that can be practically utilized is ultimately limited, even for pure, equal amplitude sine waves, by the question of economic feasibility since the number of electrical elements utilized in parallel increases with increasing number of resolution elements as may readily be seen from FIGS. 4 – 6. It should be noted, however, that with present day integrated circuit techniques, not only may the device be made relatively economically in the form illustrated in the drawing, but substantially more than twelve resolution elements can be utilized without becoming economically infeasible.

What is claimed is:

1. Apparatus for obtaining signals indicating equal length portions of each cycle of a pair of sinusoidal components of equal period and fixed phase relationship contained in an A.C. electrical waveform, so as to yield more finely resolved interpolated interval elements for each such cycle, comprising:

means for producing and albegraically adding analog functions of said pair of sinusoidal components so as to obtain first derived analog signals which are similar in form to said sinusoidal components but are shifted in phase by equal incremental amounts relative to one of said sinusoidal components, so as to cross zero at more than two equally spaced points relative to the cycle of said one sinusoidal component;

the zero crossings of said first derived analog signals forming an ordered sequence of equally spaced points for each cycle of said one of said pair of sinusoidal components with the particular sequence of crossings being determined by the relative phase relationship of said pair of components;

means for sequentially determining each such zero crossing of said first derived signals and for producing an ordered set of interval signals, each corresponding to adjacent zero crossings of said derived signals, whereby each of said interval signals discretely indicates an equal length portion of a cycle of one of the original sinusoidal components, the particular ordered nature of said set of interval signals indicating the relative phase relationship between the pair of original components.

2. Apparatus according to claim 1, in which:

said original pair of sinusoidal components are in phase quadrature and said producing and algebraically adding means comprises means for producing and adding linear functions of said pair of sinusoidal components.

3. Apparatus according to claim 2, in which:

said original pair of sinusoidal components are pure sine waves free of any D. C. components and are therefore symmetrical about zero;

and said linear functions thereof are directly proportional to said pure sine wave sinusoidal components and therefore are also free of any D. C. components, whereby said first derived analog signals are also pure sine waves, symmetrical about zero and free of any D. C. components, so that the zero crossing points of both the original sinusoidal components and also said first derived analog signals are invariable for equal amplitude changes in said original sinusoidal components.

4. Apparatus according to claim 1, further comprising:

means for receiving said interval signals, for determining the particular order of said interval signals, and for producing in accordance therewith a direction signal indicating said particular order, whereby a directional signal, ultimately determined by the relative phase relationship between the pair of original sinusoidal components, is obtained.

5. Apparatus according to claim 4, in which:

said receiving and determining means comprises means for determining upon the occurrence of each interval signal whether it was immediately preceded by that particular one interval signal which occurs immediately before it for a particular first order of said interval signals corresponding to a particular first phase relationship between said pair of original sinusoidal components, or whether it was preceded by that particular other interval signal which occurs immediately before it for a particular second order of said interval signals corresponding to a particular second phase relationship between said pair of original sinusoidal components, whereby the direction signal is produced upon the occurrence of each and every interval signal, so that ambiguity for even a single interval is avoided.

6. Apparatus according to claim 1, further comprising:

means for receiving said interval signals and for generating a discrete, countable pulse for each said interval signal, whereby each equal length portion of a cycle of one of the original sinusoidal components may be readily counted.

7. Apparatus according to claim 6, further comprising:

means for receiving and for determining the particular order of said interval signals, and for producing in accordance therewith a direction signal indicating said particular order, whereby a directional signal, ultimately determined by the relative phase relationship between the pair of original sinusoidal components is obtained, so that each discrete countable pulse may be algebraically counted in the appropriate sense.

* * * * *